April 21, 1931. W. STEVENS 1,801,578
ICE CREAM HANDLING MACHINE FOR FILLING CONFECTION SHELLS
Filed Aug. 19, 1927 5 Sheets-Sheet 1
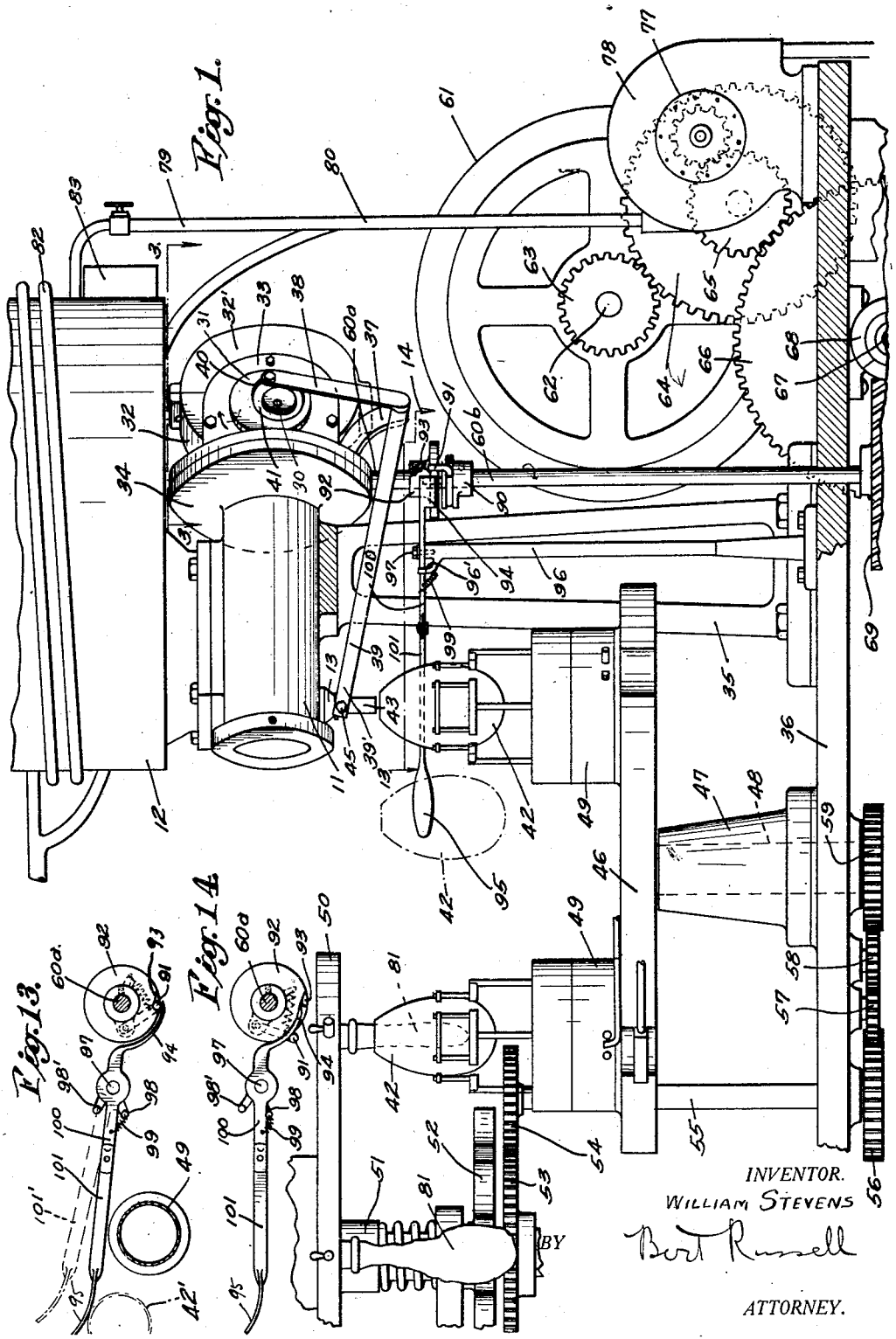
INVENTOR.
WILLIAM STEVENS
BY Bert Russell
ATTORNEY.

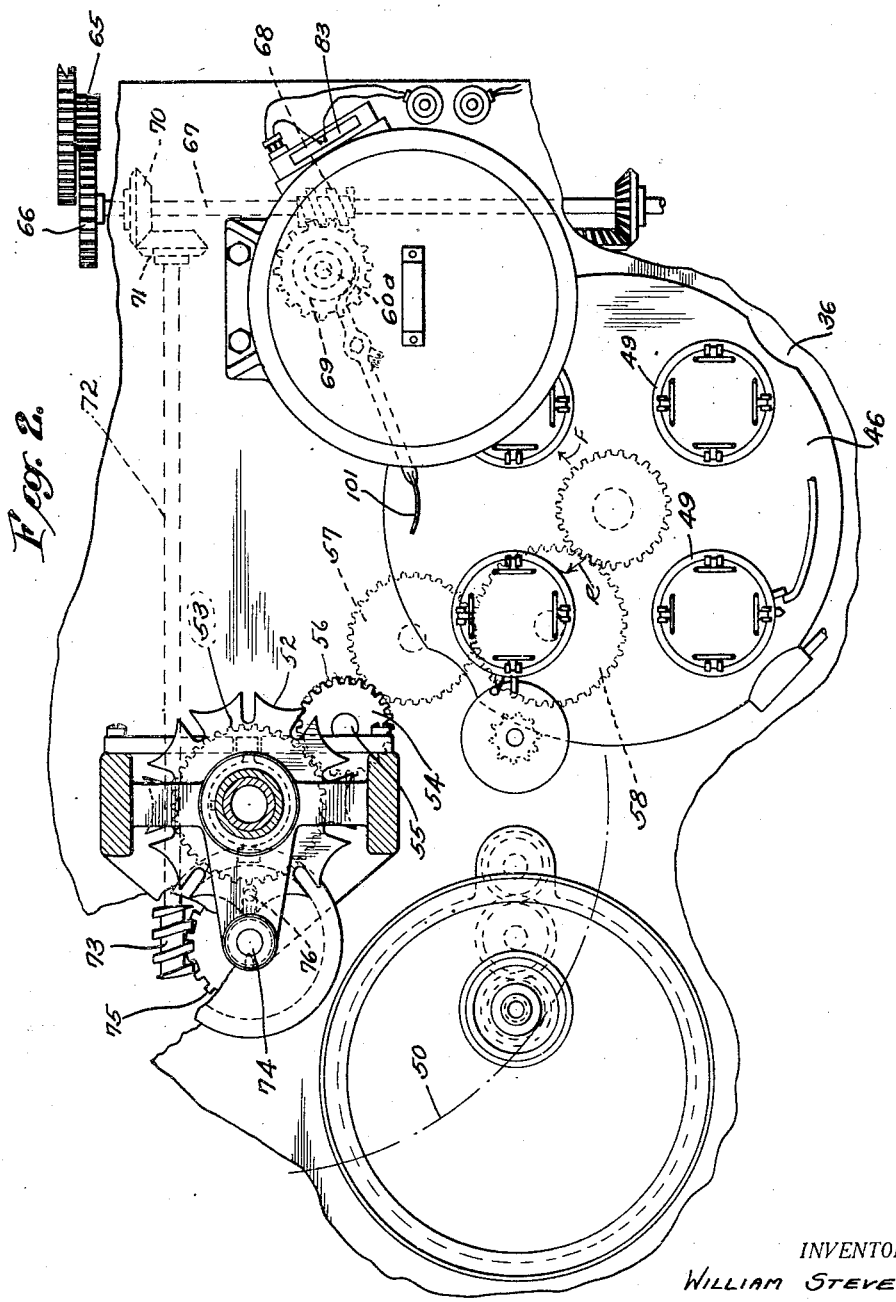

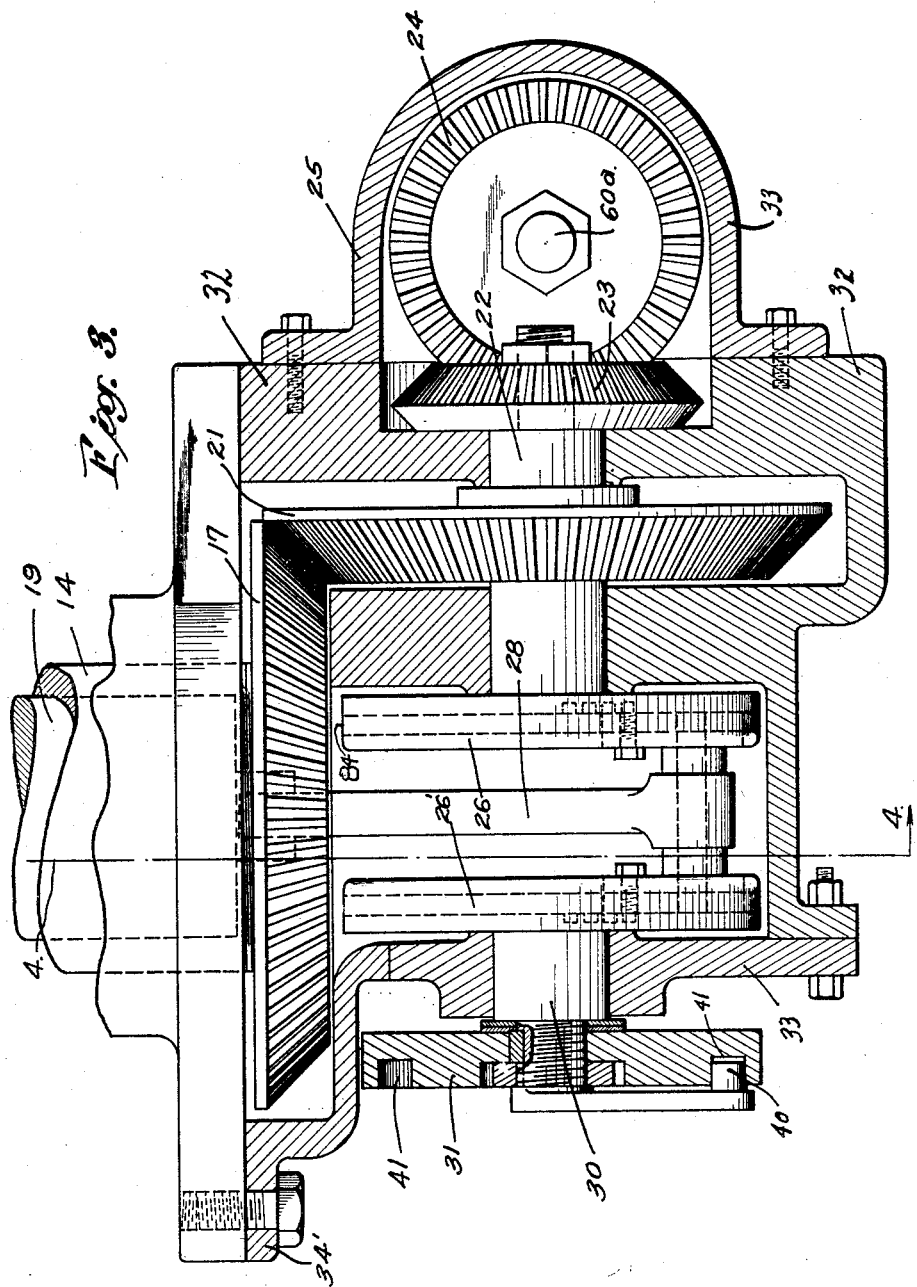

April 21, 1931.   W. STEVENS   1,801,578
ICE CREAM HANDLING MACHINE FOR FILLING CONFECTION SHELLS
Filed Aug. 19, 1927   5 Sheets-Sheet 4
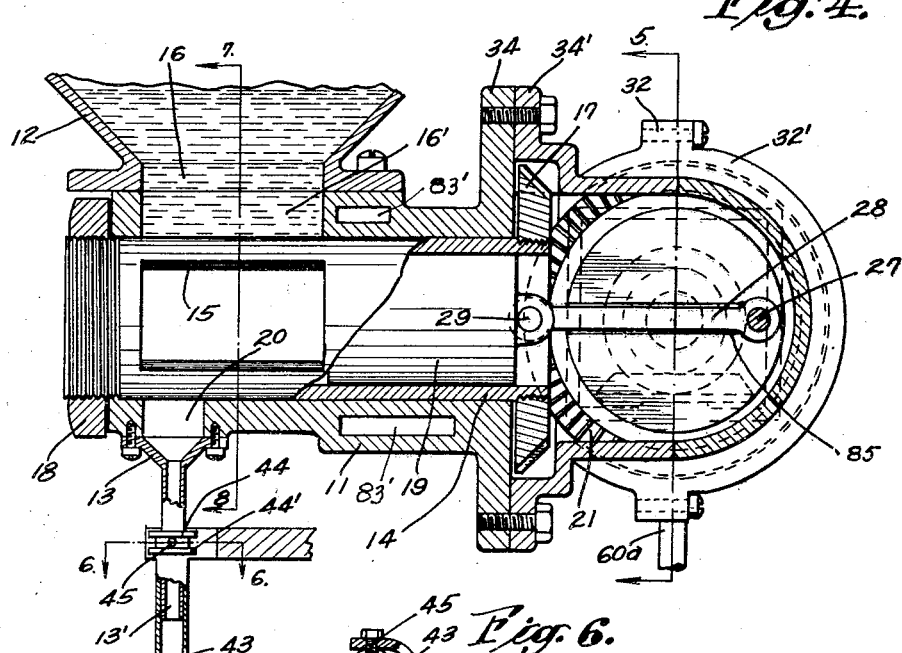
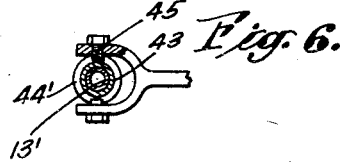
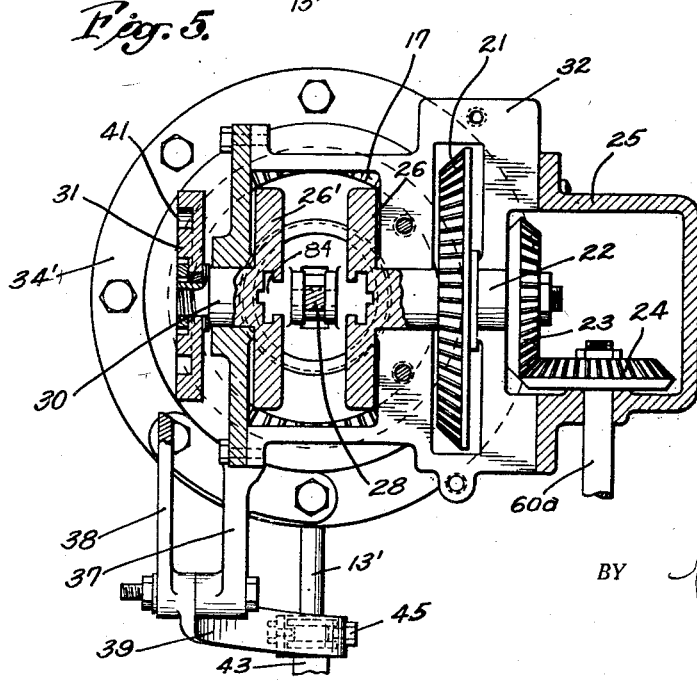
INVENTOR.
WILLIAM STEVENS
BY Bert Russell
ATTORNEY.

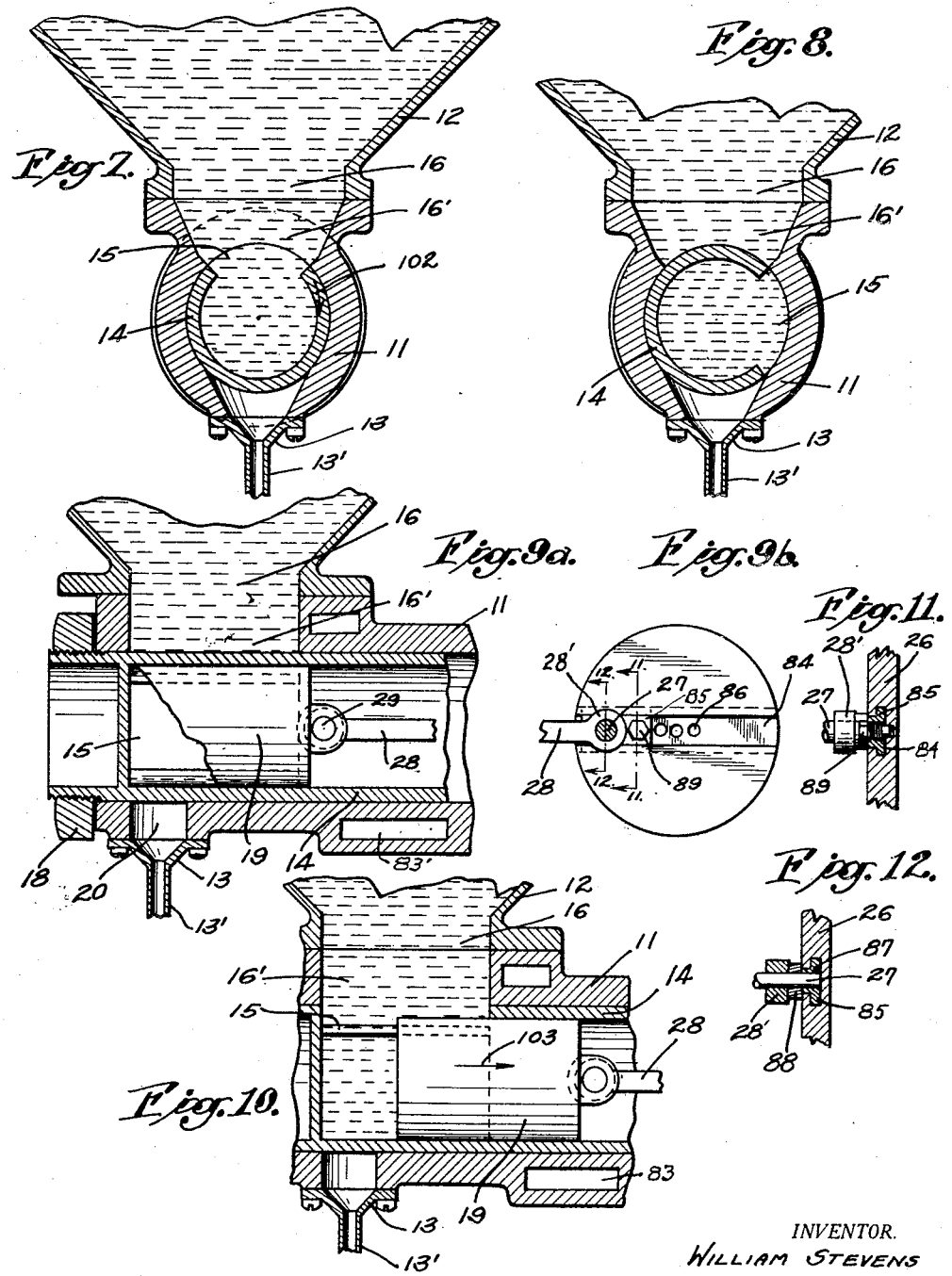

Patented Apr. 21, 1931

1,801,578

UNITED STATES PATENT OFFICE

WILLIAM STEVENS, OF LOS ANGELES, CALIFORNIA, ASSIGNOR, BY MESNE ASSIGNMENTS, TO JACK HIBBARD, OF DETROIT, MICHIGAN

ICE-CREAM-HANDLING MACHINE FOR FILLING CONFECTION SHELLS

Application filed August 19, 1927. Serial No. 214,069.

Although my invention is referred to as a machine for filling confection-shells with ice cream, it should be understood not only that this invention relates also to the synchronization of a handling machine and/or a shell-forming machine with the movements of the various parts of a filling machine, but that said filling machine may be capable of numerous alternative uses.

More specifically, my present invention, the general relations of which to a shell-forming machine were duly set forth in my application, S. N. 208,388, filed July 25, 1927 (now Pat. No. 1,771,065), relates to the filling of so-called "polar eggs", or the like, with ice cream; and it is an especial object of this invention to provide means, below a suitable hopper which may contain plastic or "slush" ice cream, or the like, whereby successive measured quantities of the fluent, but suitably chilled material (preferably at about its temperature of solidification) may be forced out through a reciprocating or other delivery tube.

In preferred embodiments of my invention, the said tube being disposed above or adapted to enter successive shells during intervals of rest in the rotative advance of a handling device, and to be held stationary or withdrawn as the shells are filled, I may dispose between said hopper and said delivery tube a measuring device comprising a suitable rotatable cylindrical element. This rotatable element may be provided with a suitable opening adapted to serve both for the reception of ice cream, or the like, from said hopper, and for the subsequent delivery thereof through said delivery tube; and I may provide, within said cylinder, a reciprocating plunger,—the movement of said plunger being suitably timed with reference to the rotation of said cylinder.

Other objects of my invention, including the optional use of special thermal control means and/or a provision of means rendering the operation of said measuring or filling device dependent upon the approach of a practically perfect shell, or the like, to be filled, may be best appreciated from the following description of an illustrative embodiment of my invention, taken in connection with the appended claims and the accompanying drawings, in which,—

Figure 1 is a diagrammatic view, with parts broken away,—this view being taken from the general direction indicated by the arrow 1 of Fig. 2.

Fig. 2 is a top plan view, diagrammatically showing a preferred special relationship of my filling machine to a handling organization (and to a shell-forming machine) parts being broken away to show certain details of preferred driving connections from an electric motor.

Fig. 3 is a large-scale sectional view, taken substantially as indicated by the line 3—3 of Fig. 1, parts being broken away.

Fig. 4 is a vertical sectional view, taken substantially as indicated by the line 4—4 of Fig. 3, but on a scale intermediate between that of Fig. 1 and that of Fig. 3.

Fig. 5 is a transverse vertical sectional view, taken substantially as indicated by the line 5—5 of Fig. 4.

Fig. 6 is a detail view, taken substantially as indicated by the line 6—6 of Fig. 4.

Fig. 7 is a vertical sectional view, taken in the plane indicated by the line 7—8 of Fig. 4, but showing an opening into a rotatable measuring cylinder as wide open (as in Fig. 10) parts being broken away.

Fig. 8 is a view similar to Fig. 7 but showing the mentioned inlet opening as closed and and an outlet aperture as on the point of opening,—this view being simultaneous with Fig. 4.

Figs. 9a and 9b are views comparable with corresponding parts of Fig. 4, but showing a plunger in its advanced position (at the completion of a shell filling operation) and a cylinder in which the same reciprocates as rotated to a position opposite to that shown in said figure.

Fig. 10 is a view, comparable with Fig. 9a. but simultaneous with Fig. 7, the mentioned plunger being in an intermediate position on its return stroke.

Figs. 11 and 12 are respectively detail views, taken substantially as indicated by the lines 11—11 and 12—12 of Fig. 9b,—to show one method of rendering the "throw" of a wrist pin adjustable and also using it in transmitting motion to a cam plate.

Figs. 13 and 14 are respectively diagrammatic horizontal sectional detail views, taken substantially as indicated by the line 13—14 of Fig. 1 and indicating the construction and action of one suitable type of "feeler" hereinafter prepared for use in the control of a clutch in a shaft by which my filling organization may be driven,—the non-engagement of said "feeler" by a shell, or the like, being effective to cause the filling machine to skip one cycle of operations.

Referring first to preferred details of construction of a measuring and delivering organization comprising an outer cylinder 11 disposed below a hopper 12 and provided with a funnel-like outlet member 13, as best shown in Figs. 4–10, inclusive, the cylinder 11 may advantageously contain an inner and rotatable cylinder 14, provided with an inlet opening 15. This opening may correspond in length with an outlet opening 16 from the hopper 12 and with a similar opening 16' in the outer cylinder 11; and the inner and rotatable cylinder 14 is shown as provided with an apertured gear 17 at one end thereof, and as retained in its assembled relationship to mentioned parts by means of a locking nut or ring 18.

The opening 15, hereinafter referred to as an inlet opening, is of such length and form as to permit a continuous intake of ice cream, or the like, from the hopper 12 during the retraction of a reciprocable member such as a plunger 19 therein; and it is so positioned that, during the advance of said plunger, and immediately after the closing of the described inlet opening, it serves as an outlet opening by partially coinciding, as implied by mentioned figures, with an outlet passage or port 20 leading into the outlet funnel 13.

To impart suitably synchronized movements to the rotatable cylinder 14 and the plunger 19, the mentioned gear 17 being shown as driven by a cooperating mitre gear 21, and the latter being shown (see especially Fig. 5) as rigidly secured upon a shaft 22. driven by an additional pair of gears 23, 24 (the latter pair being optionally protected by a housing 25) the shaft 22 may also be provided with one of a cooperating pair of wrist pin plates 26, 26'. A wrist pin 27, adjustably disposed therebetween may serve to impart a stroke, of any suitable length, to a connecting rod 28. The latter is shown as secured at its opposite end, by means of a pin 29, to the plunger 19; and the wrist pin 27 may serve also to impart rotative movement, through a shaft 30, to some transmission element, such as an optional cam plate 31, capable of serving for a purpose which I will shortly describe.

Suitable fixed bearing and housing elements 32, 32' and 33 being preferably supported directly or indirectly from a flange 34, shown as integral with the outer cylinder 11 (which may be supported by means such as a frame 35 extending downward to a table or base plate 36) one of the mentioned fixed elements (as, a flange 34' on the housing element 32) may advantageously be provided with downwardly extending rigid arm 37 (see especially Figs. 1 and 5) to provide a bearing for a lever comprising arms 38 and 39,—the arm 38 being provided with means such as a cam pin or roller 40, entering a suitably formed cam slot 41 in the plate 31; and the free end of the arm 39 may be provided with any suitable means cooperating with the outlet member 13 in effecting a reliable delivery of each unit quantity of ice cream, or the like, as pressed outward by the advance of the plunger 19, or its equivalent, for the filling of a confection shell 42, or its equivalent.

In order that ice cream, or the like, forced in a plastic or other fluent state through the outlet member 13 may be suitably fed, without undue admixture of air, into a confection shell or the like, I may surround a tubular portion 13' of said member by a slidable delivery tube 43, and I may provide, upon said delivery tube-engagement means such as a pair of suitably spaced collars or flanges 44, 44'. Providing a bifurcate terminal portion or fork 39' at the end of the arm 39 with horizontally extending pins 45, slidably disposed between said flanges and adapted to impart movement thereto (and preferably so forming the cam slot 41 as to impart a rapid downward movement to the delivery tube 43—so that the same may promptly enter a confection shell as soon as the latter is held stationary therebelow) I may so proportion mentioned parts that the ice cream is ejected during a gradual upward movement of said delivery tube toward a level which permits said shell to be horizontally advanced without breakage. I am thus able rapidly and reliably to complete successive filling operations, during comparatively short intervals of rest in any suitable horizontally rotative handling means by which the mentioned shells may be supported and advanced; but the use of a movable tube 43 is not always necessary or desirable.

For the sake of completeness, although I have fully described and claimed the same in my mentioned companion application, I may here explain (referring to Figs. 1 and 2) that my preferred shell-handling means comprises an intermittently rotative table 46,—shown as mounted upon a bearing element 47, through which extends a vertical shaft 48. Said table may be provided with a plurality of shell-gripping units 49,—four being a convenient number; and the table 46 may be suitably disposed relatively to any desired shell-forming machine, such as a machine comprising a bag-carrying head 50. Although the character of this head is immaterial to my present invention, to indicate a mechanical train by which a synchronization is effected, I may mention that it is rotated and vertically reciprocated by a hollow post 51,—to which a Geneva gear element 52 and an additional gear 53 may be secured. The latter gear may cooperate with an additional gear 54, upon a vertical shaft 55, in driving any suitable gear train (such as, a train including gears 56, 57, 58 and 59) to impart a suitably intermittent rotative movement to said table during intervals of elevation of the bag-carrying head 50. During each lowering of the head 50, a shell is intended to be delivered into one of the holders 49, the table 46 being then at rest.

It will be obvious that the described filling operations are also intended to occur during intervals of rest in the rotative advance of the table 46; and, although the gear 24, serving to drive all of the mentioned movable parts of said filling organization, may be rotated in any desired manner, I show the same as carried by an upper section 60a of a shaft comprising also a lower section 60b; and both the intermittent rotation of the table 46, or its equivalent, and a continuous or other rotation of the gear 24, or its equivalent, may be advantageously effected by means comprising a prime mover such as an electric motor 61 and a suitable transmission train. (See Fig. 1.) For example, providing the motor shaft 62 with a gear 63, shown as meshing with a larger gear 64, the latter may be rigidly connected with a smaller gear 65, serving to drive a main gear 66 mounted upon a shaft 67, suitably supported below the base plate 36; I may employ means such as a worm 68 on the shaft 67 and engaging a worm gear 69 to rotate the shaft or shaft section 60b; and I may also use a pair of bevel gears 70, 71 and a shaft 72 carrying a worm 73, as best shown in Fig. 2, to impart rotation (through a shaft 74, carrying a worm gear 75 and also a Geneva gear pin 76) to impart intermittent motion, in the indicated manner, to the bag-carrying head 50 and to the rotative table 46.

It will be obvious that in the handling of ice cream, provision may advantageously be made for the maintenance of a desired temperature; and I accordingly suggest (see Fig. 1) the employment of means such as the gear 65 (by which the main gear 66 is shown as driven) in rotating also an additional gear 77 to operate a pump 78 for suitably chilled brine, or the like. A branch 79 of an exit pipe 80 (which may be used in the delivery of chilled brine or other thermal fluid, through the shell-forming head 50 to bags 81 carried thereby,—to expand and to chill the same, in a manner immaterial to this invention) may be connected with suitable coils 82 disposed interiorly or exteriorly of the ice cream hopper 12; and, to obviate undue cooling (such as might result in an excessive solidification of the ice cream) the said hopper may also be provided with electrical thermostatic means, such as are diagrammatically indicated at 83. If desired, the outer cylinder 11 may be provided with passages 83' for the thermal fluid; and, in any case the temperature of the ice cream may be kept within a predetermined optimum range.

In order to provide for a variation in the quantity of ice cream delivered (to adapt the same, for example, to the filling of either five-cent "polar eggs" or ten-cent "polar eggs") I may employ any suitable means, such as an adjustment of the throw of the crank pin 27. For example, as best shown in Figs 9b, 11 and 12, providing the wrist pin plates 26, 26' with transverse slots 84, undercut for the reception of separate snugly-fitting sliders 85, I may provide said slots with a series of smooth or threaded openings 86 for the reception of suitable securing means; and I may provide each of the mentioned sliders not only with a major opening 87 for the reception of the wrist pin 27 (shown as extending completely therethrough, washers 88 being optionally interposed to reduce friction between the eye 28' of the link 28 and said sliders) but also with an additional and smaller opening adapted to receive a securing element such as a machine screw or bolt 89 extending into one of the mentioned openings 86.

Although it is to be assumed that, during regular operation of a shell-forming machine provided with a handling organization of the described character, none but substantially uniform and perfect shells will be presented to the described filling machine, since there is a possibility of the production of a few defective or broken shells at the beginning of a period of continuous operations, I consider it advantageous to provide means whereby the rotation of the shaft or shaft section 60a (which is assumed normally to make one revolution for each advance of the table 46,—the filling of the inner cylinder 14 being effected while the said table is in motion, and the introduction of the tube 43 and the delivery of a charge therethrough being effected during a period of rest of said table) and the consequent execution of a filling operation may be rendered contingent upon the approach of a perfect shell to a filling station F below the movable delivery tube 43 or below some corresponding fixed delivery element.

For the purpose last referred to, providing the constantly rotating shaft section 60b and the shaft section 60a respectively with suitable clutch elements (such as a lower clutch element 90, carrying a resiliently-held upstanding finger 91 and an upper clutch element 92, provided with a single notch 93, in which said finger normally rests, I may employ means such as a suitable "feeler" (optionally comprising a finger-disengaging end 94 and an egg-engaging end 95) to withdraw the finger 91, or its equivalent, from its position of engagement in case one of the egg-gripping units 49, during its advance toward the filling station F, referred to, is unprovided with a substantially perfect egg. The mentioned "feeler" is shown as pivoted upon a post 96 by means of a pivot screw 97,—said post being shown as carrying stops 98, 98'.

In order to predispose the described "feeler" toward a clutch-disengaging position, in which it may be effective to so withdraw the finger 91 as to let shaft section 60 come to rest (and consequently to omit one cycle of shell-filling operations) I may employ means such as a spring 99, shown as extending between the stop post 98 and one intermediate portion 100 of said feeler,—another intermediate portion 101 thereof being shown as pivotally connected therewith and one of said sections being engageable by an additional stop 98',—so that the described "feeler" or a portion thereof may be swung to a position of disuse, such as that indicated by dotted lines 101', when all operations are progressing smoothly.

The mode of operation and synchronization of the respective parts of my present invention having been indicated in connection with the respective descriptions thereof, I comment that simultaneous views 4 and 8 should be understood to show the completion of a cylinder-filling stroke of the plunger piston 19,—the intake passage 16' being closed at substantially the same moment that the outlet opening 20 from the inner cylinder 14 begins to open by rotation of said cylinder through an intermediate position such as is shown in simultaneous views 7 and 10,—direction of rotation being indicated by the arrow 102. Direction of plunger movement being indicated by the arrow 103, it will be seen that the relative positions of mentioned parts at the completion of a cylinder-emptying movement is shown in Figs. 9a and 9b,—the interval, if any, during which both of the openings 16 and 20 are closed being so exceedingly brief as to be without detrimental effect, in view of the air (compressible) contained in the ice cream and/or the harmonic character of the movement of the wrist pin 27. It will, however, be understood that unless the described "feeler" is manually set in its inoperative position (as by shifting the "fixed" end of spring 99 to the alternative stop 98') the continuous rotation of the shaft 60a, with the indicated effects, is contingent upon the presence and engagement by said "feeler", of suitable shells, or the like, in the holders 49 during their advance through a position such as that indicated at 42', Fig. 13, on their way from a shell-receiving station R to the filling station F,—the uncoupling action which occurs in the absence of a shell (to cause the filling machine to skip one cycle of operation) being best indicated in Fig. 14.

Although I have herein described a single complete embodiment of my invention, it should be understood not only that various features thereof might be independently employed, but also that numerous modifications, additional to any suggested herein, might easily be devised by workers skilled in the arts to which this case relates,—without involving the slightest departure from the spirit and scope of my invention as the same is indicated above and in the following claims.

I claim as my invention:—

1. In a machine suitable for the filling of confection shells: an outer cylinder provided with an inlet and an outlet; a rotatable inner cylinder provided with an opening registrable alternatively with said inlet and said outlet; and means, reciprocable relatively to one of said cylinders, for advancing successive predetermined quantities of fluent material to and from said inner cylinder during successive rotative advances of said opening past said inlet and said outlet,—said outlet opening being provided with a vertically reciprocable delivery tube.

2. In a machine suitable for the filling of confection shells: an outer cylinder provided with an inlet and an outlet; a rotatable inner cylinder provided with an opening registrable alternatively with said inlet and said outlet; and means, reciprocable relatively to one of said cylinders, for advancing successive predetermined quantities of fluent material to and from said inner cylinder during successive advances of said opening past said inlet and said outlet,—said outlet opening being provided with a vertically reciprocable delivery tube and means for withdrawing said tube during an advance of said reciprocable means.

3. In a machine suitable for the filling of confection shells, an outer cylinder provided with a single inlet and an outlet, a rotatable inner cylinder provided with a single opening registrable alternatively with said inlet and said outlet, an apertured gear on said rotatable cylinder providing means for rotation, and means reciprocable in said inner cylinder and comprising a plunger and a connecting rod movable through said gear for advancing successive predetermined quantities of fluent material to and from said inner cylinder during successive rotative advances of said opening past said inlet and said outlet, said outlet being provided with a reciprocable delivery tube movable longitudinally and driving means for said gear and cylinder and said reciprocable means and discharge tube.

4. In a machine suitable for the filling of confection shells, a carrier for said shells, means for intermittently advancing said carrier to bring successive shells to filling position, filling means comprising an outer cylinder provided with an inlet and an outlet, a rotatable inner cylinder provided with an opening registrable alternatively with said inlet and said outlet, and means, reciprocable relatively to one of said cylinders, for advancing successive predetermined quantities of fluent material to and from said inner cylinder during successive rotative advances of said opening past said inlet and said outlet, said outlet opening being provided with a vertically reciprocable delivery tube adapted to direct outgoing fluent material into a shell in filling position.

5. In a machine suitable for the filling of confection shells, a carrier for said shells, means for intermittently advancing said carrier to bring successive shells to filling position, filling means comprising an outer cylinder provided with an inlet and an outlet, a rotatable inner cylinder provided with an opening registrable alternatively with said inlet and said outlet, and means, reciprocable relatively to one of said cylinders, for advancing successive predetermined quantities of fluent material to and from said inner cylinder during successive rotative advances of said opening past said inlet and said outlet, said outlet opening being provided with a vertically reciprocable delivery tube adapted to direct outgoing fluent material into a shell in filling position, and means to prevent operation of said filling means in absence of a shell at filling position.

6. In a machine suitable for the filling of confection shells, an outer cylinder provided with an inlet and an outlet; a rotatable inner cylinder provided with an opening registrable alternatively with said inlet and said outlet; and means, reciprocable relatively to one of said cylinders, for advancing successive predetermined quantities of fluent material to and from said inner cylinder during successive advances of said opening past said inlet and said outlet, said outlet opening being provided with a vertically reciprocable delivery tube and means for withdrawing said tube during an advance of said reciprocable means, and means to prevent operation of said filling means in absence of a shell in position to receive the discharge from said outlet.

In witness whereof, I have hereunto affixed my signature.

WILLIAM STEVENS.